(No Model.)

H. A. SIEGRIST & G. M. BITTMAN.
WATER FILTER.

No. 486,413. Patented Nov. 15, 1892.

WITNESSES.
Jos. W. Crookes
Wm. M. Byrne.

INVENTORS
Henry A. Siegrist
George M. Bittman
by Paul Bakewell
their attorney

UNITED STATES PATENT OFFICE.

HENRY A. SIEGRIST AND GEORGE M. BITTMAN, OF ST. LOUIS, MISSOURI.

WATER-FILTER.

SPECIFICATION forming part of Letters Patent No. 486,413, dated November 15, 1892.

Application filed August 4, 1890. Serial No. 360,915. (No model.)

*To all whom it may concern:*

Be it known that we, HENRY A. SIEGRIST and GEORGE M. BITTMAN, citizens of the United States, residing in the city of St. Louis and State of Missouri, have invented a certain new and useful Improvement in Water-Filters, of which the following is a full, clear, and exact description.

Our invention relates to improvements in apparatus for filtering and purifying water, more particularly to that class of filters in which a supply of water is put in the filter itself, instead of the filter being constantly connected with the hydrant or water-supply pipes.

It has for its object to provide means whereby the flow of water through the filtering medium will be suitably moderated.

Figure 1:
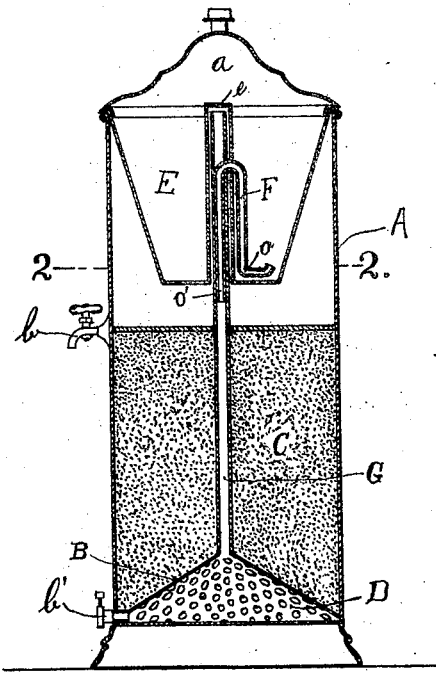
Figure 2:
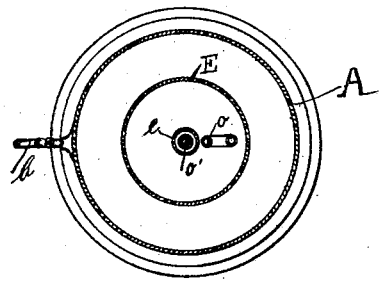

In the accompanying drawings, in which like letters of reference denote like parts in the several views, Figure 1 is a longitudinal section taken through the center of the filter; and Fig. 2 is a cross-section of the filter, taken on a level with the line 2 2 in Fig. 1.

Into the filter-can or containing-vessel A, which is provided with a cover $a$, a faucet $b$ for withdrawing the filtered water properly placed, and a faucet $b'$ for withdrawing the residue and sediment when the filter is cleaned, is fitted a conical or concave shaped false bottom B, so that when placed in the bottom of the can A it shall act as a support for the filtering material C forming the hollow space D at the bottom of the can for receiving the residue and sediment. This false bottom piece B is perforated, so as to permit a free flow of the water, as hereinafter described. Into the top of the can is fitted the removable supply-pan E, which is supported, preferably, on the upper edge of the filter-can A. Into a hole, preferably in the center of the bottom of this supply-can E, is fitted, so as to be water-tight, a pipe $e$, which extends upward and through the pan to a point approximately level with the top of the same. Into one side of this pipe $e$, at a point somewhat below the level of the top of the pan, is fitted, so as to be water-tight, the neck of the siphon-tube F, with its short leg $o$ inside and extending to near the bottom of the pan E and its long leg $o'$ extending through the pipe $e$ to a level below that of the bottom of the pan E. Within the tube $e$ and extending from the upper end thereof to the perforated false bottom piece B is the tube G, which conducts the water, as supplied by the siphon from the supply-pan E, through and to below the filtering material C. One side of the upper end of this tube G is slotted out for a short distance to admit of the long leg of the siphon being inserted therein when the several parts are put together.

The operation of the filter is as follows: Suppose there is no water in the pan E. If the pan E be filled with water to be filtered up to the level of the bend in the siphon, the said water will flow through the siphon and down through the tube G to the space beneath the false bottom B, whence it percolates upward through the filtering material to the clear-water chamber. This flow, by reducing the level of the water in pan E and raising the level of the water in the clear-water chamber, will bring the water in these two vessels to a common level and will then cease, a considerable quantity of unfiltered water still remaining in the supply-pan E. Every time a glass or pitcher of water is withdrawn through faucet $b$ this will slightly lower the level of water standing in the clear-water chamber. A flow will therefore be established from the pan E through the siphon and tube G, and thence up through the filtering medium, which flow will cease when the water in the clear-water chamber and that in the pan E have again come to a common level, as explained above. This flow and the accompanying percolation of water up through the filtering medium will be very slow and gentle, because there is only a very slight difference in the level or head of the water between the pan E and the clear-water chamber. Usually in practice the filter will be replenished from time to time before all the filtered water has been used—that is to say, generally when fresh water is being poured into pan E there is still enough water left therein to cover the opening in the siphon, owing to the fact that the water in pan E cannot fall lower than the water in the clear-water chamber. Air cannot therefore enter the siphon until the water in the clear-water chamber has fallen below the level of the point where the water enters the siphon. If the filter be replenished before this point is reached, the siphon will operate, no matter how little fresh water is added, and will continue to operate until the filtered and unfiltered water again stand at the same level. Were the supply-pan wholly above the clear-water chamber in a filter of the class herein set forth, the siphon, when once started, would continue to operate continuously until all the water had been drawn from the supply-pan E, whereupon said siphon would cease to operate and would start again only when the supply-pan was filled above the bend in said siphon. Another obvious advantage, therefore, of placing the supply-pan and clear-water chamber at a common level is this, that if the filter be replenished from time to time before all the filtered water is drawn off the siphon will not have to be restarted, but will operate, no matter how small may be the quantity of fresh water added.

The gradual and quiet percolation of the water through the filtering medium, which is due to the slight difference of level between the water in pan E and the water in the clear-water chamber, has three advantages, first, the impurities are more perfectly caught by the filtering medium when the flow is gradual; secondly, since a considerable portion of the water remains almost at rest for a considerable length of time in the pan E before entering the filter proper the coarser impurities in the water will have time to settle and collect at the bottom of the pan, and, thirdly, these impurities will not be sucked into the siphon as they would be if the flow were more rapid.

When the filter is being cleansed, the pan E, carrying the tube e and siphon F, is simply lifted out and the sediment rinsed from the bottom of said pan.

It will be observed, first, that one of the main features of this filter is the fact that the vessels containing, respectively, the filtered and the unfiltered water are placed, practically, at a common level; secondly, that the most compact and desirable shape for a filter is that of a cylinder; thirdly, that it is important to have the clear-water chamber located above the filtering medium, so as to afford a greater head of water when the filter is cleansed in the manner hereinafter described, and, fourthly, that the bottom of the clear-water chamber should be substantially coincident with the upper surface of the filtering medium, so as to cause the water to filter uniformly through all parts of the filtering medium. These four features are combined in our filter, in which the pan E, being shaped like the inverted frustum of a cone, depends within the clear-water chamber, the two vessels containing water at substantially the same level and the bottom of the clear-water chamber being at the same time substantially coincident with the upper surface of the filtering medium. Were the clear-water chamber and receiving-pan placed side by side over the filtering material, the effect would be to create a current through the filtering medium in the portion thereof lying directly beneath the clear-water chamber, while there would be almost no water flowing through the remaining portions of the filtering medium.

One advantage which a siphon has over an ordinary simple discharge-tube is this, that for a given rate of flow—say one gallon per five minutes—the caliber of the siphon will be considerably greater than that of a simple discharge-tube, and the siphon is therefore less likely to be choked up by the impurities in the water; again, the velocity of the water discharged being less (for a given rate of discharge) the greater the caliber of the discharging-tube, it follows that the discharge by a siphon will cause less disturbance of the water in the pan E than if a simple discharge-tube were used, whereby the preliminary separation of coarser impurities will be more effectually accomplished by using a siphon.

The filtering medium is cleansed in the ordinary manner—to wit, a quantity of filtered water is permitted to collect in the clear-water chamber. The faucet $b'$ is then opened, and the water descends with considerable velocity through the filtering material, sweeping out the impurities which have been collected therein and carrying the same out by way of the faucet $b'$.

The pan E should fit rather loosely in the rim of the vessel A, so as to give opportunity for the air to pass freely in and out of said vessel A as the level of the water varies therein. This is obviously necessary to prevent variations of pressure in the air, which would interfere with the proper working of the filter.

Having fully described our invention, what we desire to claim and secure by Letters Patent of the United States is—

In a filter, the combination of a vessel, a filtering medium placed in the lower part thereof, a clear-water chamber located above said filtering medium and communicating therewith, a removable supply-pan depending within said clear-water chamber and constructed to retain water at a common level therewith, a tube secured to and extending within the supply-pan, a pipe leading from beneath the filtering medium and extending into said tube, and a siphon secured to said tube and having its short leg terminating within said supply-pan, its bend below the top of the supply-pan, and its long leg projecting into said pipe, whereby the supply-pan may be removed, cleansed, and replaced without disturbing the remaining parts of the filter.

In testimony whereof we have hereunto affixed our signatures, in presence of two witnesses, this 23d day of July, 1890.

HENRY A. SIEGRIST.
    GEORGE M. BITTMAN.

Witnesses:
 JOS. W. CROOKES,
 WM. M. O'BYRNE.